United States Patent
Sherwood (10) Patent No.: US 12,357,092 B2
(45) Date of Patent: Jul. 15, 2025

(54) SUPPORT STRUCTURE BOOT

(71) Applicant: Stephen Palmer Sherwood, Roswell, GA (US)

(72) Inventor: Stephen Palmer Sherwood, Roswell, GA (US)

( * ) Notice: Subject to any disclaimer, the term of this patent is extended or adjusted under 35 U.S.C. 154(b) by 0 days.

(21) Appl. No.: 17/871,667

(22) Filed: Jul. 22, 2022

(65) Prior Publication Data
US 2023/0115682 A1 Apr. 13, 2023

Related U.S. Application Data

(60) Provisional application No. 63/224,671, filed on Jul. 22, 2021.

(51) Int. Cl.
*A47B 91/04* (2006.01)
*F16M 11/20* (2006.01)
*F21V 21/02* (2006.01)

(52) U.S. Cl.
CPC ......... *A47B 91/04* (2013.01); *F16M 11/2007* (2013.01); *F21V 21/02* (2013.01); *F16M 2200/08* (2013.01)

(58) Field of Classification Search
CPC ............ F16M 11/2007; F16M 2200/08; F21V 21/02; A47B 91/04
See application file for complete search history.

(56) References Cited

U.S. PATENT DOCUMENTS

| | | | | |
|---|---|---|---|---|
| RE3,187 E | * | 11/1868 | Winchester | 248/188.9 |
| 755,713 A | * | 3/1904 | Shanahan | E06C 7/46 248/188.9 |
| 879,471 A | * | 2/1908 | Kabureck | A45B 9/04 135/84 |
| 1,340,616 A | * | 5/1920 | Lynde | A61H 3/0288 29/DIG. 92 |
| 1,340,617 A | * | 5/1920 | Lynde | A61H 3/0288 135/86 |
| 1,429,428 A | * | 9/1922 | Hipwood | A61H 3/0288 135/86 |
| 1,670,853 A | * | 5/1928 | Gebhard | A47B 91/12 16/8 |
| 1,921,561 A | * | 8/1933 | Burton | A47B 91/04 248/188.9 |
| 2,103,095 A | * | 12/1937 | Schermerhorn | A47C 7/002 248/188.9 |
| 2,301,385 A | * | 11/1942 | Ehrgott | F16F 1/376 248/346.11 |
| 2,744,283 A | * | 5/1956 | Reineman | A47B 91/04 248/188.9 |
| 2,910,995 A | * | 11/1959 | Candido | A47B 91/066 248/362 |
| 3,025,557 A | * | 3/1962 | Knowlton | A47B 91/066 16/42 T |

(Continued)

*Primary Examiner* — Eret C McNichols
(74) *Attorney, Agent, or Firm* — Ballard Spahr LLP (57) ABSTRACT

A boot assembly for use with a leg on a support stand of a lighting fixture, including a body portion formed by a side wall defining a recess having a top opening, and a base portion including a substantially planar bottom surfacer, a top wall, and a perimeter side wall extending therebetween, wherein the body portion extends upwardly from the top wall of the base portion and a distal end of the leg is slidably received in the recess of the body portion.

14 Claims, 7 Drawing Sheets

(56) References Cited

U.S. PATENT DOCUMENTS

| | | | | |
|---|---|---|---|---|
| 3,166,782 | A * | 1/1965 | Ellis | A47B 91/066 16/42 R |
| 3,342,445 | A * | 9/1967 | Bouwkamp | A47B 91/06 16/42 T |
| 3,467,117 | A * | 9/1969 | Lucibello | A47B 91/12 135/84 |
| 4,098,283 | A * | 7/1978 | Tritle, Jr. | A45B 9/04 135/77 |
| 4,135,536 | A * | 1/1979 | Willis | A45B 9/04 135/84 |
| 5,178,176 | A * | 1/1993 | Fetterman | A61H 3/0288 135/86 |
| D338,223 | S * | 8/1993 | Mine | 248/188.9 |
| 5,743,506 | A * | 4/1998 | Adams | A47B 91/00 248/346.11 |
| 6,279,592 | B1 * | 8/2001 | Yamamoto | A45B 9/04 135/82 |
| 6,374,841 | B1 * | 4/2002 | Yamamoto | A61H 3/0288 135/84 |
| 6,754,934 | B1 * | 6/2004 | Shiffler | A47B 91/06 16/42 T |
| 6,910,246 | B2 * | 6/2005 | Desmarais | A47C 7/002 16/42 T |
| D512,870 | S * | 12/2005 | Rochon | D6/610 |
| 7,207,534 | B2 * | 4/2007 | Crain | F16M 13/02 248/188 |
| 7,222,827 | B2 * | 5/2007 | Crain | F16M 11/28 403/321 |
| 7,748,396 | B2 * | 7/2010 | Lasota | A61H 3/0288 135/77 |
| 8,166,990 | B2 * | 5/2012 | Daily | A45B 7/00 135/65 |
| 8,621,710 | B2 * | 1/2014 | Carpinella | A47B 91/06 16/42 T |
| 8,678,021 | B2 * | 3/2014 | Vasilatos | A61H 3/0288 135/84 |
| 8,998,164 | B2 * | 4/2015 | Marquardt | A47B 91/06 248/688 |
| D738,103 | S * | 9/2015 | White | D3/17 |
| 9,955,760 | B2 * | 5/2018 | Chen | A61H 3/0277 |
| 9,962,000 | B2 * | 5/2018 | Rondina | A47C 7/002 |
| 9,968,194 | B2 * | 5/2018 | Bushey | A47B 91/06 |
| 10,413,077 | B2 * | 9/2019 | Freelend | A47B 9/14 |
| 10,420,396 | B2 * | 9/2019 | Hwang | A43B 21/42 |
| 10,722,046 | B1 * | 7/2020 | Poslowski | A47D 1/004 |
| 11,832,693 | B2 * | 12/2023 | Miller | A45B 9/04 |
| 2004/0227040 | A1 * | 11/2004 | Crain | F16M 11/28 248/163.1 |
| 2005/0115022 | A1 * | 6/2005 | Desmarais | A47B 91/066 16/42 R |
| 2007/0290104 | A1 * | 12/2007 | Denison | F16M 11/36 248/188.8 |
| 2014/0263886 | A1 * | 9/2014 | Brown | A47B 91/00 248/188.8 |
| 2017/0318910 | A1 * | 11/2017 | Hwang | A43B 23/30 |
| 2019/0203876 | A1 * | 7/2019 | Johnson, Sr. | G03B 17/561 |

\* cited by examiner

SUPPORT STRUCTURE BOOT

CLAIM OF PRIORITY

This application claims priority to U.S. provisional patent application No. 63/224,671 filed Jul. 22, 2021, the disclosure of which is incorporated by reference herein.

TECHNICAL FIELD

The presently disclosed invention relates generally to systems and methods of lighting and, more specifically, to portable light fixtures and their associated support stands.

BACKGROUND

Portable lighting fixtures are well known and their use occurs in widely varied environments such as, but not limited to, residences, garage work stations, performance stages, movie sets, etc. Known fixtures often have collapsible support stands to facilitate moving the fixtures from one location to the next and, also quite often, have feet on the stands that provide inadequate support surfaces for the entire fixture. Known support stands often include multiple cylindrical legs in which the contact point for the foot of each leg is only a portion of the outer perimeter of a distal end of the leg. For example, the distal end face of the leg is often perpendicular to the longitudinal center axis of the leg, and when the leg is formed by a cylindrical tube, the contact point is merely tangent to the circular distal end. These minimal contact surfaces can lead to inadvertent sliding of the fixtures, which in turn can lead to damage to the support surface, instability and damage to the fixture and/or harm to nearby personnel, loss of time and added expense on film sets, etc. Common solutions, such as the placement of tennis balls on the ends of the structure's legs are frequently inadequate due to continued sliding, potential harm to personnel when cutting openings in the tennis balls to receive the corresponding legs therein, availability, etc.

As such, it is desirable to have the ability to place aftermarket covers, or boots, on the legs of lighting fixture support stands to improve stability and provide protection for the support surface.

SUMMARY OF INVENTION

One embodiment of the present disclosure provides a boot assembly for use with a leg on a support stand of a lighting fixture, including a body portion formed by a side wall defining a recess having a top opening, and a base portion including a substantially planar bottom surfacer, a top wall, and a perimeter side wall extending therebetween, wherein the body portion extends upwardly from the top wall of the base portion and a distal end of the leg is slidably received in the recess of the body portion.

Another embodiment of the present disclosure provides a support stand of a lighting fixture, including at least a first leg having a distal end defining a foot, and a boot assembly, having a body portion formed by a side wall defining a recess having a top opening, and a base portion including a substantially planar bottom surface, a top wall, and a perimeter side wall extending therebetween, wherein the body portion extends upwardly from the top wall of the base portion and a distal end of the leg is slidably received in the recess of the body portion.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of a lighting fixture support stand, such as but not limited to "vertical," "horizontal," "upper," "lower," "above," or "below," refer to directions and relative positions with respect to the lighting fixture support stand's orientation in its normal intended operation, as indicated in the Figures herein. Thus, for instance, the terms "vertical" and "upper" refer to the vertical direction and relative upper position in the perspectives of the Figures and should be understood in that context, even with respect to a reactor that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 6:
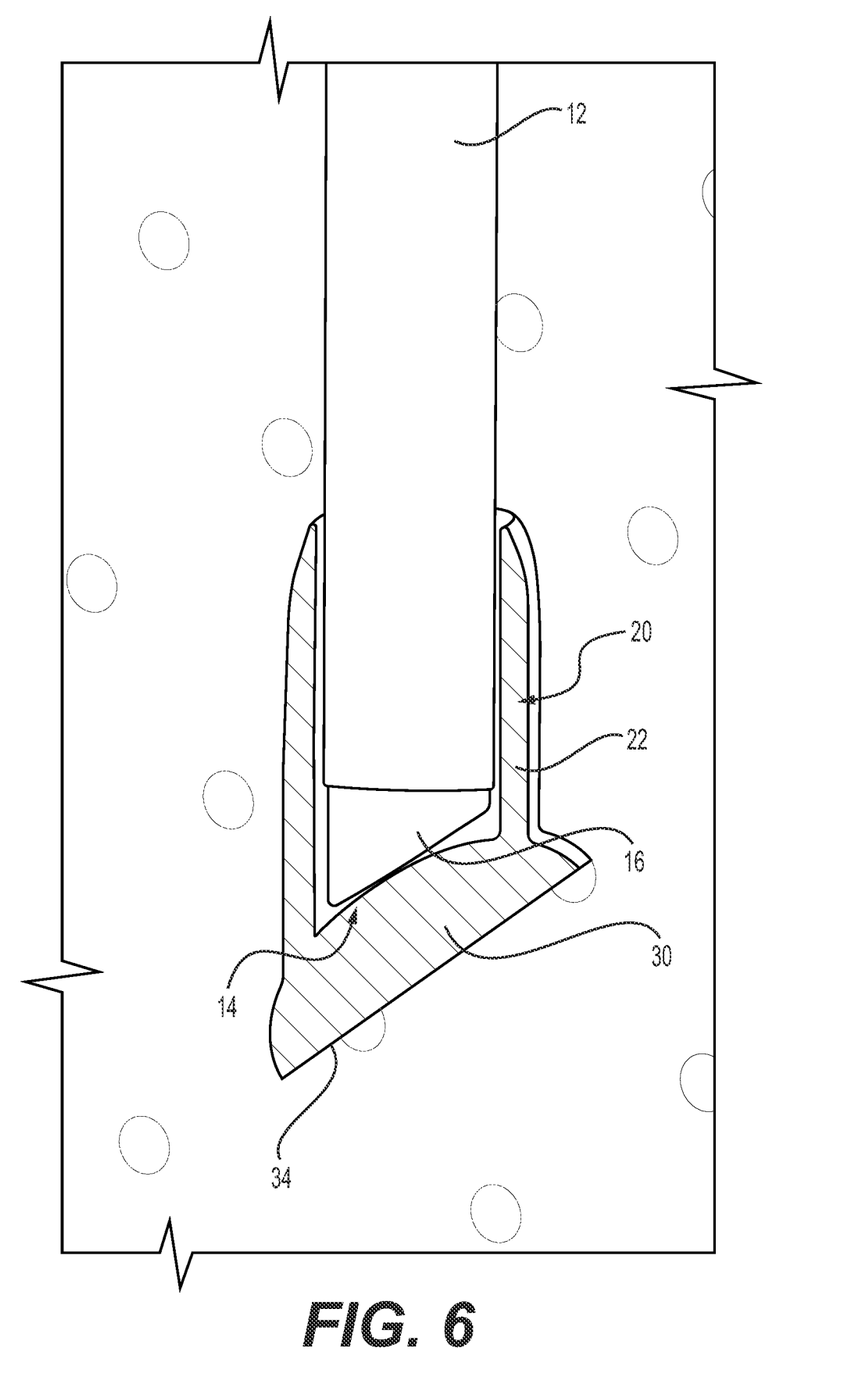
FIG. 6 is a cross-sectional view of a boot, as shown in FIG. 1, mounted on a leg of a corresponding lighting fixture support stand.

Referring now to FIGS. 1 through 4, a boot assembly 20 in accordance with an embodiment of the present disclosure is shown. The boot assembly 20 preferably includes a body portion 22 that is formed by a cylindrical side wall 24. The side wall 24 defines a cylindrical recess 28 having a top opening 26 and is configured to slidably receive a foot 14 of a fixture stand 10 therein, as shown in FIG. 6. A base portion 30 is disposed at the bottom of the body portion 22.

Figure 1:
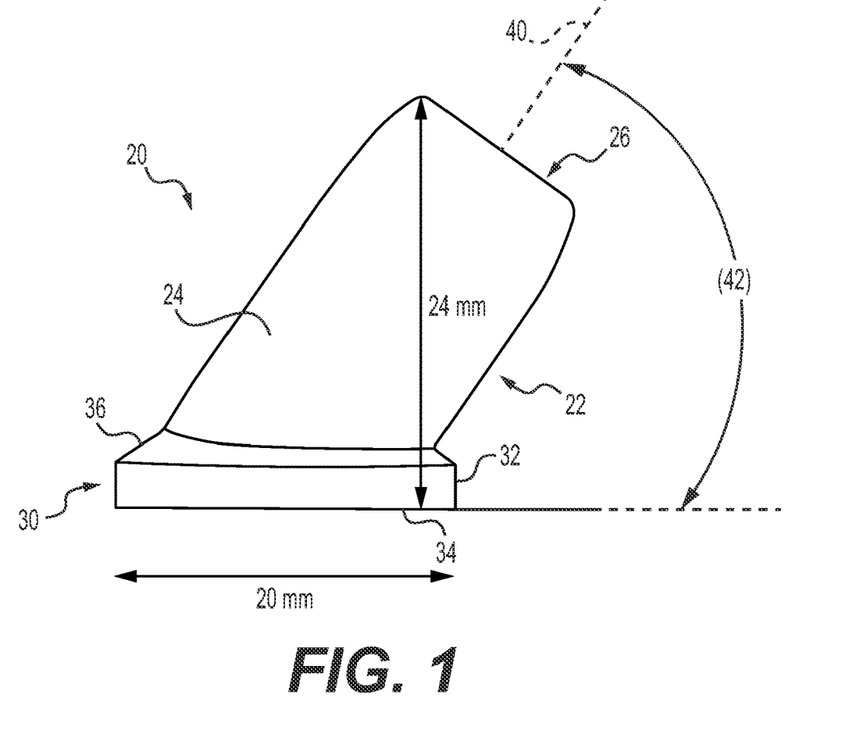
FIG. 1 is a front view of a boot for use on the leg of a lighting fixture stand in accordance with an embodiment of the present disclosure.
Figure 2:
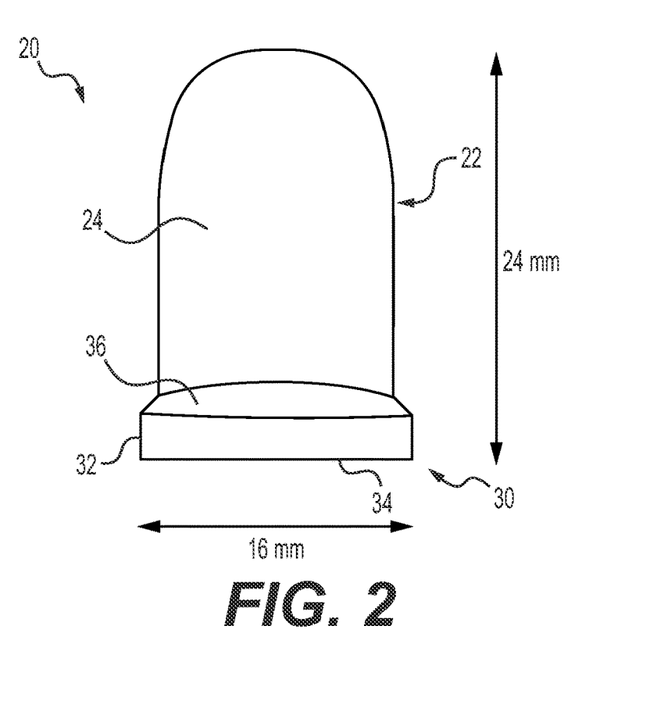
FIG. 2 is a side view of the fixture stand boot shown in FIG. 1.
Figure 3:
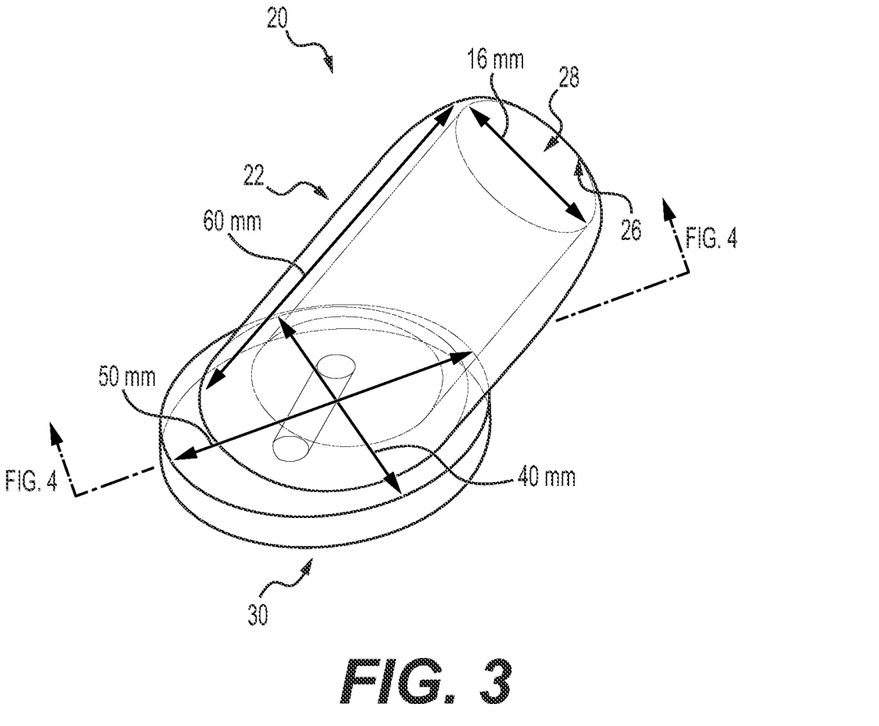
FIG. 3 is a perspective view of the lighting fixture boot shown in FIG. 1.
Figure 4:
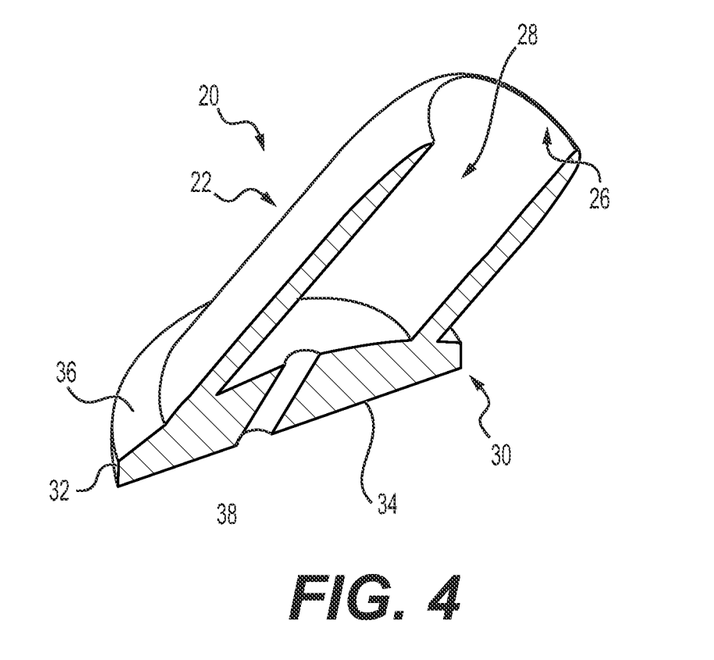
FIG. 4 is a perspective cross-sectional view of the fixture stand boot shown in FIG. 3, taken along line 4-4.

As best seen in FIG. 4, the base portion 30 preferably includes a dome-shaped top wall 36, a planar bottom surface 34, and an outer perimeter wall 32 extending therebetween. The base portion 30 preferably includes a bore 38 extending therethrough so that any fluids that may enter the cylindrical recess 28 of the body portion 22 will not accumulate but, rather, will drain through the bore 38. As well, where soft, conformable materials are used in the construction of the boot assembly 20, the bore 38 prevents the planar bottom surface 34 of the boot assembly 20 from forming a suction with an extremely smooth support surface.

Figure 5:
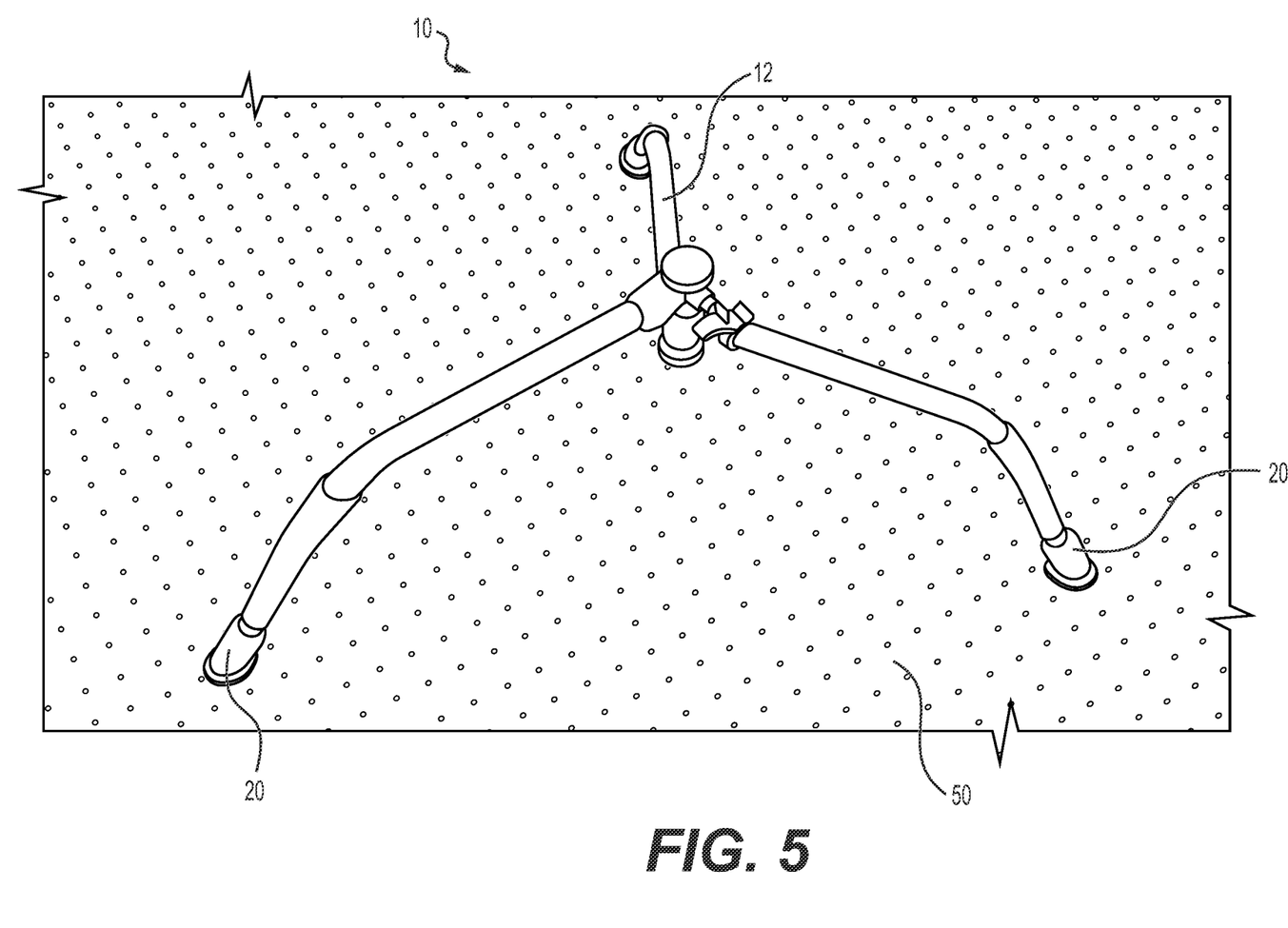
FIG. 5 is a perspective view of a lighting fixture stand including boots, as shown in FIG. 1, mounted to each leg thereof.
Figure 7:
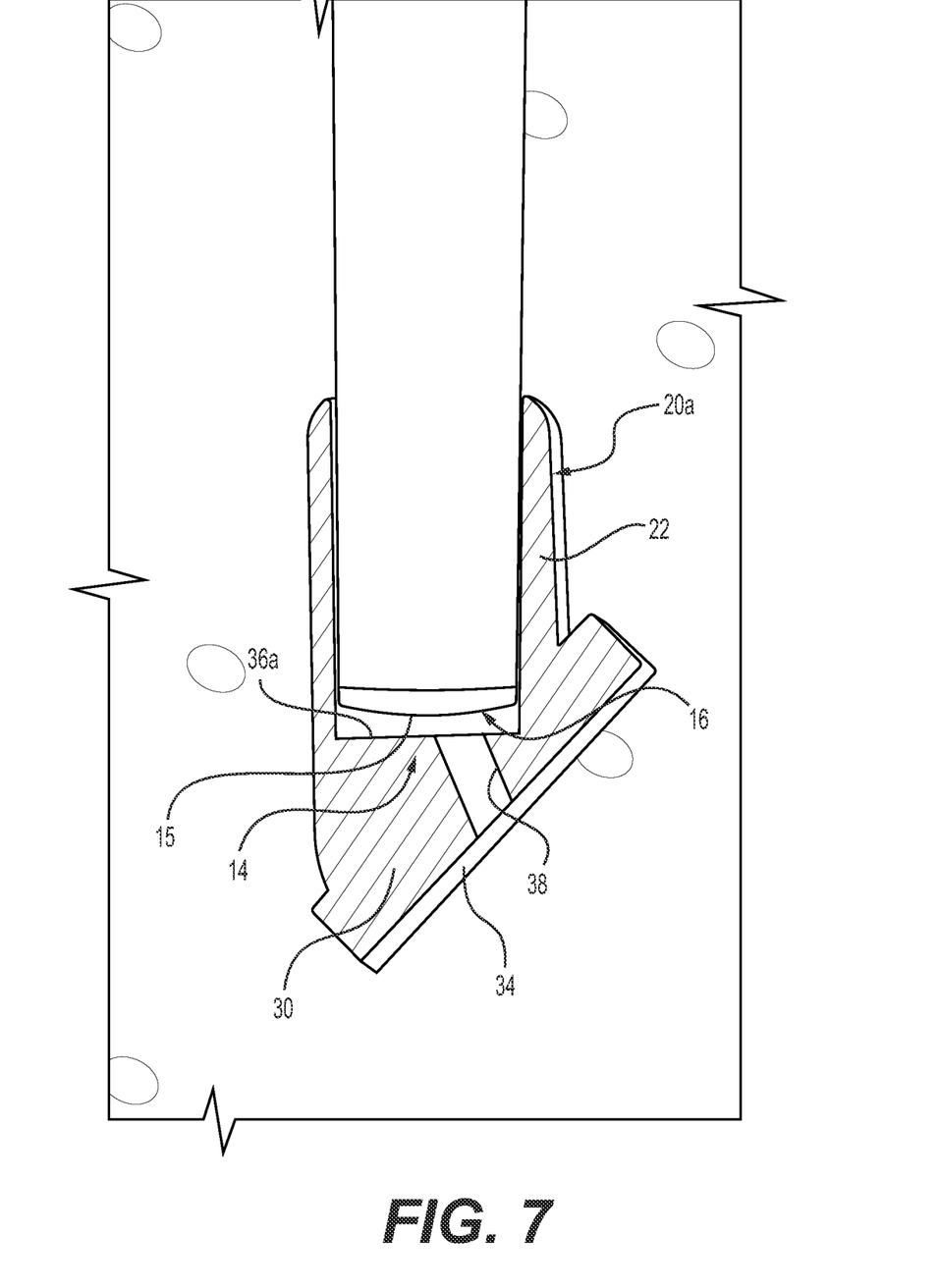
FIG. 7 is a cross-sectional view of an alternate embodiment of a boot, in accordance with the disclosure, mounted on a leg of a lighting fixture support stand.

As shown in FIGS. 5 and 6, each boot assembly 20 is configured to be slidably received on the foot 14 of a corresponding leg 12 of a fixture support stand 10 so that the bottom surface 34 of each boot assembly 20 is substantially parallel to the support surface 50 disposed beneath the fixture stand 10. As such, for the embodiment shown in which the boot assembly 20 is formed by a molding operation, the body portion 22 is angled with respect to the base portion 30 such that the longitudinal center axis 40 of the body portion 22 forms an angle 42 with the plane in which the bottom surface 34 lies. Angle 42 is substantially the same as the angle the foot 14 of the support stand 10 forms with the support surface 50. In the instant case, angle 42 is an acute angle. However, in other embodiments the angle may be 90°, or perpendicular. As best seen in FIG. 6, the boot assembly 20 increases the overall contact surface supporting the support stand 10 as the support area of each planar bottom surface 34 is greater than the support area of a standard fixture stand foot cap 16. As shown in FIG. 7, in an alternate embodiment of a support boot 20a, the top wall 36 of the base portion 30a is not domed. Rather, a portion 36a of the top wall 36 is angled to be perpendicular to the longitudinal center axis 40 of the body portion. As such, portion 36a is substantially parallel to, and abuts, the end face 15 of the leg 12 of the support stand 10.

As noted above the embodiment of the boot assembly 20 shown in FIGS. 1 through 4 is preferably formed in a molding operation. The material used may vary dependent upon the support surface on which the boot assembly 20 is to be used. For example, on harder surfaces such as, but not limited to, wood, marble, ceramic tile, etc., a more pliant and, therefore, more slip-resistant material may be desired. On softer support surfaces such as, but not limited to, carpet, turf, soil, etc., a rigid material may be desirable. As well, regardless of the material that is used to construct the support boot 20, contact pads 40 (FIG. 10) may be secured to the planar bottom surface 34 of the base portion 30 dependent upon the surface on which the fixture is to be used. For example, the contact pad 40 may include a contact surface that is fabric, rubberized, hard plastic, ribbed, etc., with the contact pad 40 being removably secured to the base portion by an adhesive layer. Additionally, the boot assembly 20 can be manufactured in bright colors such as yellow, red, orange, neon green, etc., to improve visibility thereof and reduce the likelihood of personnel inadvertently tripping over the legs of the corresponding fixture support stand 10.

Figure 8:
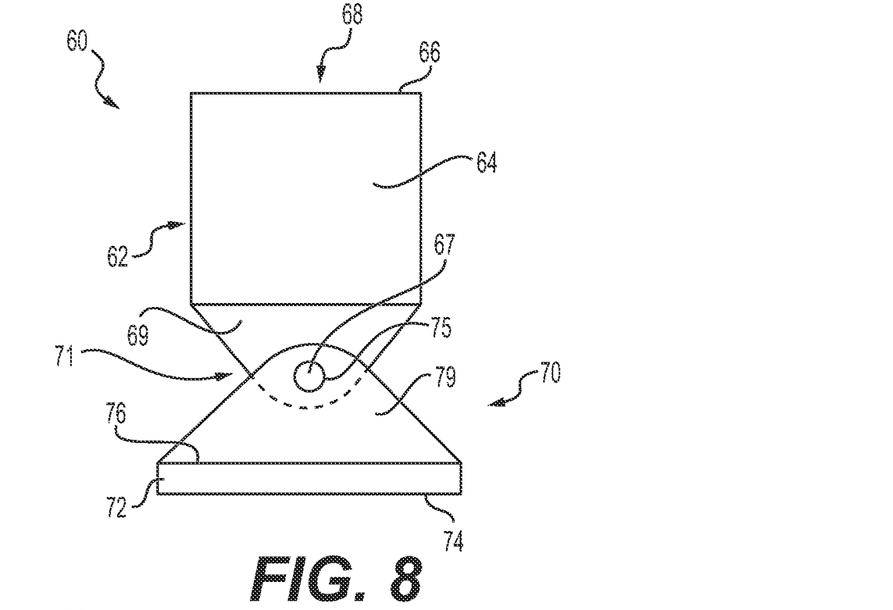
FIG. 8 is a side view of an alternate embodiment of a boot in accordance with the disclosure.
Figure 9:
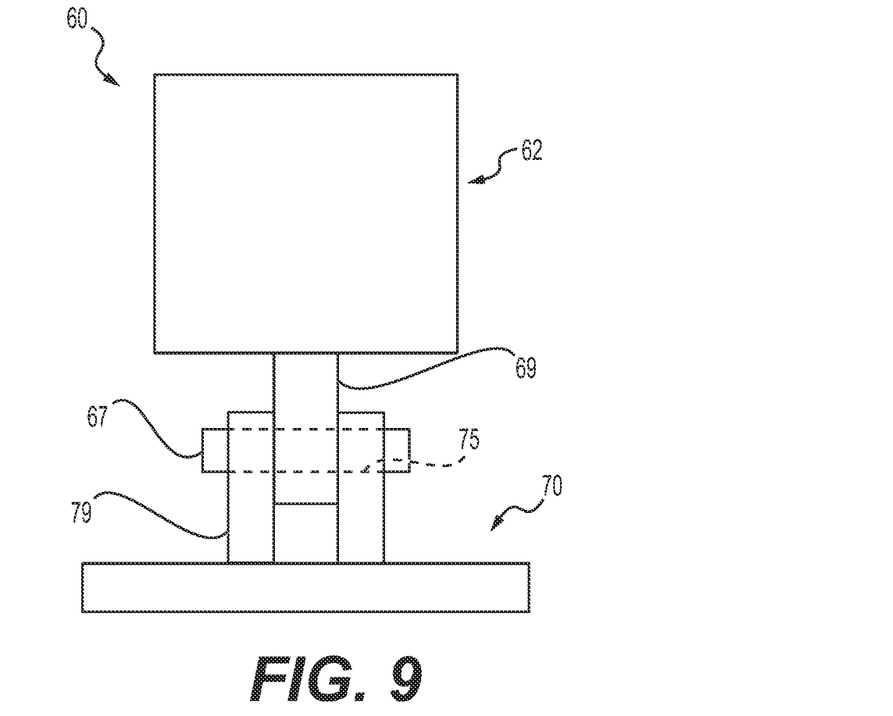
FIG. 9 is a side view of the lighting fixture boot shown in FIG. 8.

Referring now to FIGS. 8 and 9, a boot assembly in accordance with an alternate embodiment of the present disclosure is shown. Similarly to the first embodiment, the boot assembly 60 includes a body portion 62 that is formed by a cylindrical side wall 64. The side wall 64 defines a cylindrical recess 68 having a top opening 66 and is configured to slidably receive a foot 14 of a corresponding fixture stand 10 therein. As well, a base portion 70 is disposed at the bottom of the body portion 62. In contrast to the previously described embodiment, the base portion 70 of the present embodiment is pivotably mounted to the body portion 62 by a hinged connection 71.

As shown, the base portion 70 preferably includes a top surface 76, a planar bottom surface 74, and an outer perimeter wall 72 extending therebetween, with the top and bottom surfaces being substantially parallel. The base portion 70 also includes a hinge 71 including a pair of parallel flanges 79 extending upwardly from the top surface 76. Each of the flanges 79 defines a cylindrical recess 75 therein that is configured to receive a corresponding cylindrical pin 67. The body portion 62 includes a central flange 69 that extends downwardly from the bottom of the body portion 62 (and is received in a gap defined between the flanges 79 of the base portion 70. Once positioned, the pin 67 is passed through the recesses 75 of the flanges 79 and a corresponding recess (not shown) on central flange 69 to secure the portions together. Each boot assembly 60 is configured to be slidably received on the foot 14 of a corresponding leg 12 of a fixture support stand and the hinged connection 71 connecting the body portion 62 and the base portion 70 allows each base portion 70 to be adjusted based on the angle the corresponding leg 14 forms with the support surface.

Figure 10:
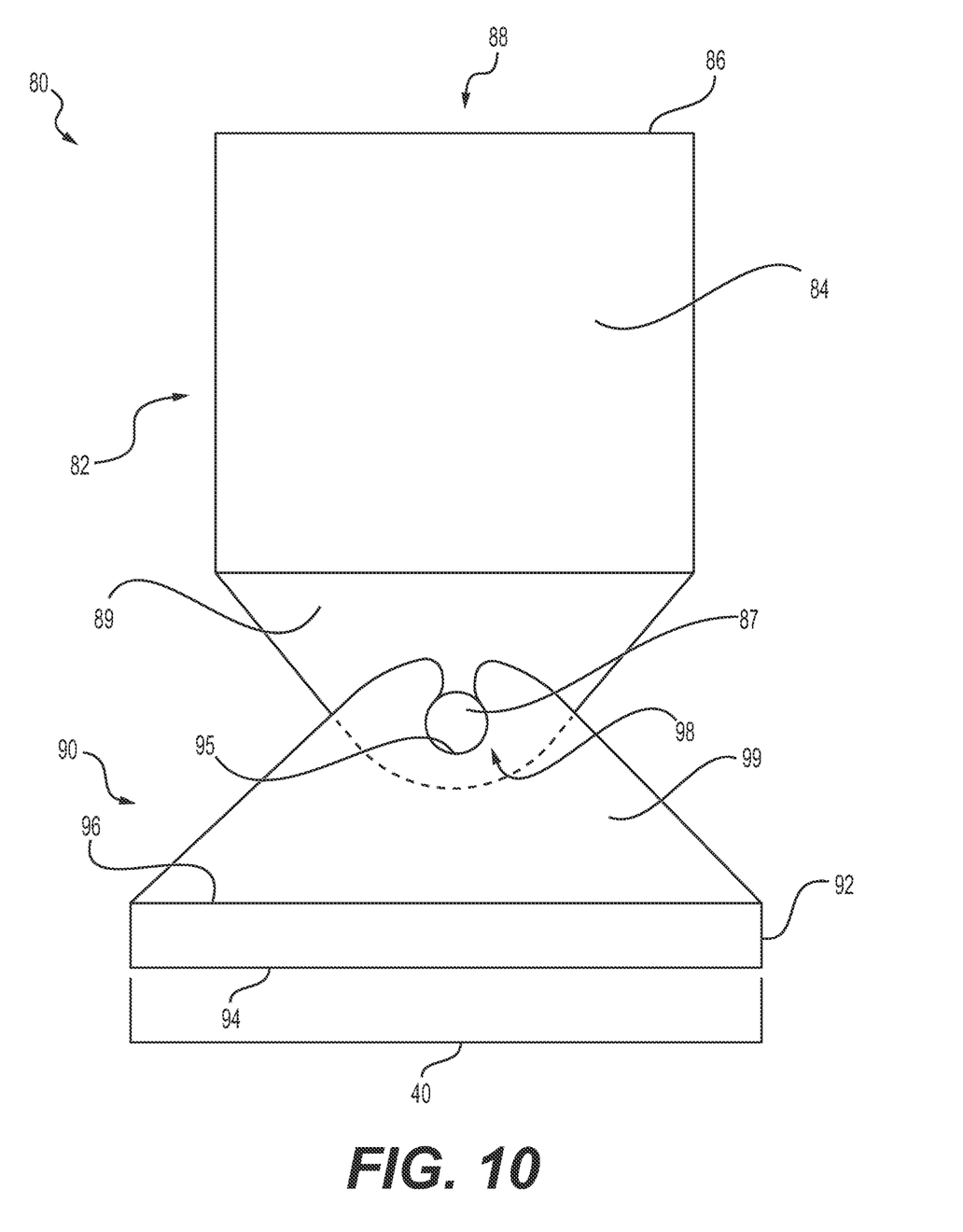
FIG. 10 is a side view of a base portion of an alternate embodiment of a boot in accordance with the present disclosure.

Referring now to FIG. 10, a boot assembly 80 in accordance with yet another alternate embodiment of the present disclosure is shown. Similarly to the second embodiment, the boot assembly 80 includes a portion 82 that is formed by a cylindrical side wall 84. The side wall 84 defines a cylindrical recess 88 having a top opening 86 and is configured to slidably receive a foot 14 of a corresponding fixture stand 10 therein. A base portion 90 is disposed at the bottom of the body portion 82 and includes a top surface 96, a planar bottom surface 94 and an outer perimeter wall 92 extending therebetween, with the top and bottom surfaces being substantially parallel. The base portion 90 also includes a cradle 98 formed by a pair of parallel flanges 99 extending upwardly from the top surface 96. Each of the flanges 99 defines a semi-cylindrical recess 95 therein that is configured to receive a corresponding cylindrical trunnion 87 of the body portion 82. The trunnions 87 extend outwardly from a central flange 89 that extends downwardly from the bottom of the body portion 82. Each boot assembly 60 is configured to be slidably received on the foot 14 of a corresponding leg 12 of a fixture support stand and the pivotable joint connecting the body portion 82 and the base portion 90 allows each base portion 90 to be adjusted based on the angle the corresponding leg 14 forms with the support surface. As shown, boot assembly 80 includes a removable contact pad 40 adhered to the planar bottom surface 94.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A boot assembly for use with a leg on a support stand of a lighting fixture, comprising:
   a body portion formed by a side wall defining a recess having a top opening, wherein the recess has a longitudinal center axis, a radial dimension, and a minimum depth, wherein the minimum depth is greater than the radial dimension; and
   a base portion including a substantially planar bottom surface, a dome-shaped top wall, and a perimeter side wall extending therebetween, wherein the dome-shaped top wall is configured to bias axially against a distal end of the leg on the support stand, wherein the longitudinal center axis of the recess of the body portion forms an acute angle with the planar bottom surface, wherein the base portion extends radially outwardly relative to the body portion so that the body portion and the base portion form an annular ridge, wherein the base portion has a largest radial dimension at the substantially planar bottom surface, wherein the substantially planar bottom surface is configured to contact a support surface beneath the boot assembly,
   wherein the body portion extends upwardly from the top wall of the base portion, wherein a distal end of the leg is configured to be slidably received in the recess of the body portion.

2. The boot assembly of claim 1, wherein the body portion and the recess are substantially cylindrical.

3. The boot assembly of claim 1, wherein the body portion and the base portion are unitarily formed.

4. The boot assembly of claim 1, further comprising a through bore extending from the bottom planar surface to the top surface of the base portion.

5. The boot assembly of claim 1, wherein the dome-shaped top wall intersects the side wall.

6. The boot assembly of claim 1, wherein the dome-shaped forms an apex that intersects the longitudinal central axis of the recess of the body portion.

7. The boot assembly of claim 1, wherein the body portion and the base portion are unitarily formed of a soft, conformable material.

8. A support stand of a lighting fixture, comprising:
   a plurality of legs, each leg comprising:
      a distal end portion that forms an acute angle with a support surface when the support stand is resting on the support surface; and
      a stand foot cap coupled to the distal end portion, the stand foot cap defining a foot; and
   a boot assembly, comprising:
      a body portion formed by a side wall defining a recess having a top opening; and
      a base portion including a substantially planar bottom surface, a dome-shaped top wall, and a perimeter side wall extending therebetween,
      wherein a longitudinal center axis of the recess of the body portion forms an acute angle with the planar bottom surface that is substantially equal to the acute angle formed by the distal end portion of each leg of the support stand and the support surface beneath the support stand, and
      wherein the body portion extends upwardly from the top wall of the base portion,
   wherein the distal end portion of a first leg of the plurality of legs is slidably received in the recess of the body portion, wherein the stand foot cap of the first leg contacts and axially biases against the dome-shaped top wall.

9. The support stand of claim 8, wherein the body portion and the recess are substantially cylindrical.

10. The support stand of claim 8, wherein a longitudinal center axis of the recess of the body portion forms an angle with the planar bottom surface that is substantially equal to an angle formed by the leg of the support stand and a support surface beneath the support stand.

11. The support stand of claim 8, wherein the body portion and the base portion are unitarily formed.

12. The support stand of claim 8, further comprising a through bore extending from the bottom planar surface to the top surface of the base portion.

13. The support stand of claim 8, wherein the dome-shaped top wall intersects the side wall.

14. A boot assembly for use with a leg on a support stand of a lighting fixture, comprising:
   a body portion formed by a side wall defining a recess having a top opening, wherein the recess has a longitudinal center axis, a radial dimension, and a minimum depth, wherein the minimum depth is greater than the radial dimension; and
   a base portion including a substantially planar bottom surface, a dome-shaped top wall, and a perimeter side wall extending therebetween, wherein the dome-shaped top wall is configured to bias axially against a distal end of the leg on the support stand, wherein the longitudinal center axis of the recess of the body portion forms an acute angle with the planar bottom surface, wherein the substantially planar bottom surface is configured to contact a support surface beneath the boot assembly,
   wherein the body portion and the base portion are unitarily formed of a soft, conformable material, and
   wherein the body portion extends upwardly from the top wall of the base portion, wherein a distal end of the leg is configured to be slidably received in the recess of the body portion.

* * * * *